US008086947B2

(12) United States Patent
Takano

(10) Patent No.: US 8,086,947 B2
(45) Date of Patent: Dec. 27, 2011

(54) DOCUMENT PROCESSING APPARATUS, DOCUMENT PROCESSING SYSTEM AND DATA STRUCTURE OF DOCUMENT FILE

(75) Inventor: Tadashi Takano, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1347 days.

(21) Appl. No.: 11/488,157

(22) Filed: Jul. 18, 2006

(65) Prior Publication Data

US 2007/0192702 A1 Aug. 16, 2007

(30) Foreign Application Priority Data

Feb. 13, 2006 (JP) ................................. 2006-035360

(51) Int. Cl.
G06F 17/00 (2006.01)
G06F 3/00 (2006.01)
(52) U.S. Cl. ........................................ 715/202; 715/748
(58) Field of Classification Search .................. 715/748, 715/202, 205, 209
See application file for complete search history.

(56) References Cited

U.S. PATENT DOCUMENTS

| | | | | |
|---|---|---|---|---|
| 5,764,960 | A * | 6/1998 | Perks et al. | 715/841 |
| 5,784,583 | A * | 7/1998 | Redpath | 715/841 |
| 5,801,701 | A * | 9/1998 | Koppolu et al. | 715/821 |
| 7,401,286 | B1 * | 7/2008 | Hendricks et al. | 715/203 |
| 7,512,898 | B2 * | 3/2009 | Jennings et al. | 715/822 |
| 2003/0011640 | A1 * | 1/2003 | Green et al. | 345/810 |
| 2003/0033333 | A1 * | 2/2003 | Nishino et al. | 707/531 |
| 2003/0140309 | A1 * | 7/2003 | Saito et al. | 715/500 |
| 2004/0050940 | A1 * | 3/2004 | Brugerolle et al. | 235/487 |
| 2005/0165984 | A1 * | 7/2005 | Seier et al. | 710/52 |
| 2006/0224962 | A1 * | 10/2006 | Ostojic et al. | 715/716 |
| 2007/0157266 | A1 * | 7/2007 | Ellis et al. | 725/89 |
| 2007/0250591 | A1 * | 10/2007 | Milic-Frayling et al. | 709/217 |
| 2007/0256027 | A1 * | 11/2007 | Daude | 715/810 |

FOREIGN PATENT DOCUMENTS

| | | |
|---|---|---|
| JP | 2005-149220 | 6/2005 |
| JP | 2005-182595 | 7/2005 |
| WO | WO 03/025786 | 3/2003 |

OTHER PUBLICATIONS

Koved, Larry, et al, "Embedded Menus: Selecting Items in Context", Communications of the ACM, vol. 29, Issue 4, ISSN: 0001-0782, pp. 312-318, Apr. 1986.*
Notice of Reasons for Refusal, issued by Japanese Patent Office, dated May 25, 2011, in a Japanese patent application No. 2006-035360 (3 pages).

* cited by examiner

*Primary Examiner* — Laurie Ries
(74) *Attorney, Agent, or Firm* — Finnegan, Henderson, Farabow, Garrett & Dunner, L.L.P.

(57) ABSTRACT

A document processing apparatus, including: a communication section to communicate with an external device; a document storage section to store a document file including a content portion and a menu information portion, wherein a content is stored in the content portion and menu information of executable processing for the content is stored in the menu information portion; and a menu display control section to control the communication section so as to transmit the menu information of an accessed document file to the external device, when an access request for the document file is received from external device via the communication section.

28 Claims, 6 Drawing Sheets

DOCUMENT PROCESSING APPARATUS, DOCUMENT PROCESSING SYSTEM AND DATA STRUCTURE OF DOCUMENT FILE

CROSS REFERENCE TO RELATED APPLICATION

The present application is based on Japanese Patent Application No, 2006-035360 filed with Japan Patent Office on Feb. 13, 2006, the entire content of which is hereby incorporated by reference.

BACKGROUND OF THE INVENTION

1. Technical Field

This invention relates to a document processing apparatus and a document processing system which can execute various kinds of processing on document files, and a data structure of the document files.

2. Description of Related Art

In a conventional local environment in which a storage unit such as a hard disk device capable of storing document files is housed in or directly connected to a computer device, an extension available to application programs is attached to the file name of a document file so that the operating system OS of the computer device may recognize the type of the document by the extension, wherein the OS correlates an application program corresponding to a kind of the extension with a document file having that extension. For example, the OS provides a function of making a list of application programs that the user can execute on a selected document file and displaying an operational guidance according to the extension of the document file. This assures a preferable operability on document files.

A technology has been disclosed (for example by Japanese Non-Examined Patent Publication 2005-182595) to enable browsing of document files even when the computer device does not contain an appropriate application program by encapsulating digital information (contents itself) which is a document entity and a program which performs displaying and transferring on the digital information into a single document file.

Besides, a server and client environment has been provided wherein terminal devices connected to a network can respectively access document files which have been stored in a server on the network in advance. In this environment, the storage location of each document file to be accessed is identified by a UNC (Universal Naming Convention) name format (¥¥servername¥directoryname¥filename.extension) for easy accessibility. Further, since the extension in a UNC name format relates document types to application programs, the operability of this environment is similar to that of the local environment.

In addition to the above server and client environment, there has been a peer-to-peer environment which enables devices connected to the network to transfer data to and from each other directly without a server intervention. In this peer-to-peer environment, it is assumed that document files are scattered and stored in personal computers (PC) and multi-function devices in the network. Therefore, users in the peer-to-peer environment must recognize and remember in which devices the target document files are stored. This is bothersome and ready to cause memory slips. Further, when a document file is transferred from one device to another device, the user must remember its new location (a server name in the UNC format) once more. This is very inconvenient to the users.

To solve such problems, a technology has been disclosed (for example, by Japanese Non-Examined Patent Publication 2005-149220) which allocates an IP (Internet Protocol) address to each document file and uses the IP address to access the document file. By using the IP addresses, the users can access target document files without knowing devices which store target document files.

Using the technology that allocates an IP address to each document file can improve accessibility to document files that are dispersed and stored in personal computers PC and multi-function devices in the peer-to-peer environment. However, since the IP address does not use such an extension as is used in the UNC form, document files cannot be related to application programs. Therefore, the operability of document files is inferior.

Further, although extensions are used for relationship between document files and application programs, the extensions cannot bear so much information. Therefore, when types of processing executable on document files increase, the users cannot get appropriate and satisfactory information about operations of document files.

As described above, the technology disclosed by Japanese Non-Examined Patent Publication 2005-182595 encapsulates a document entity and its application program into a single document file. This technology can relate document entities to application programs. However, an object of this technology is to provide only specific functions for document entities of a single purpose as in a conference system on a network. Accordingly, when various kinds of processing and operation are to be executed on documents, the program part becomes huge and may be enormous. This may be inefficient in storing and transferring document data.

An object of this invention is to solve the above problems and provide a document file data structure which can provide users with information about various processing (and operations) which are executable on stored document files; and a document processing apparatus and a document processing system which handle document files of the data structure.

Another object of this invention is to provide a document file data structure which can provide users with information about processing (and operations) which are executable on stored document files, a document processing apparatus and a document processing system which handle document files of the data structure, while increasing the accessibility to document files which are scattered and stored in multiple devices in a peer-to-peer environment.

SUMMARY

In view of foregoing, an object of this invention is to solve at least one of the problems, and to provide new document processing apparatus, new document processing system and new data structure of a document file. The apparatus includes: a communication section to communicate with an external device; a document storage section to store a document file including a content portion and a menu information portion, wherein a content is stored in the content portion and menu information of executable processing for the content is stored in the menu information portion; and a menu display control section to control the communication section so as to transmit the menu information of an accessed document file to the external device, when an access request for the document file is received from external device via the communication section.

According to another aspect of the present invention, the document processing apparatus includes: a communication section to communicate with an external device; a document storage section to store a document file including a identification portion, a content portion and a menu information portion, wherein identification information is stored in the identification portion, a content is stored in the content portion and menu information of executable processing for the content is stored in the menu information portion; a search section to search a document file in the document storage section, when identification information from the external device is received via the communication section, wherein the identification portion of a searched document file stores identification information matches the identification information received at the communication section; and a menu display control section to control the communication section so as to transmit the menu information of the searched document file to the external device.

According to the present invention, the document processing system includes: a terminal device; and a document processing apparatus connected to the terminal device, wherein the terminal device comprises a request transmitting section to transmit an access request for a document file to the document processing apparatus, wherein the document processing apparatus comprises a document storage section to store a document file including a content portion and a menu information portion, wherein a content is stored in the content portion and menu information of executable processing for the content is stored in the menu information portion, a request receiving section to receive the access request from the terminal device, and a menu display control section to control the communication section so as to transmit the menu information of an accessed document file to the terminal device, wherein the terminal device further comprises a menu receiving section to receive the menu information from the document processing apparatus, a selecting section to accept to select a processing based on the menu information, and an instruction transmitting section to transmit an execution instruction information relating to the processing selected at the selecting section, wherein the document processing apparatus further comprises an instruction receiving section to receive the execution instruction information, a processing execution section to execute the processing for the content in accordance with the execution instruction information, and a returning section to return processing information relating to the processing executed by the processing execution section to the terminal device.

According to another aspect of the present invention, the document processing system includes: a terminal device; and a document processing apparatus connected to the terminal device, wherein the terminal device comprises identification information transmitting section to transmit identification information for a document file to the document processing apparatus, wherein the document processing apparatus comprises a document storage section to store a document file including a identification portion, a content portion and a menu information portion, wherein identification information is stored in the identification portion, a content is stored in the content portion and menu information of executable processing for the content is stored in the menu information portion; identification information receiving section to receive the identification information from the terminal device, a search section to search a document file in the document storage section, when identification information from the external device is received via the communication section, wherein the identification portion of a searched document file stores identification information matches the identification information received at the communication section; and a menu display control section to control the communication section so as to transmit the menu information of the searched document file to the external device, wherein the terminal device further comprises a menu receiving section to receive the menu information from the document processing apparatus, a selecting section to accept to select a processing based on the menu information, and an instruction transmitting section to transmit an execution instruction information relating to the processing selected at the selecting section, wherein the document processing apparatus further comprises an instruction receiving section to receive the execution instruction information, a processing execution section to execute the processing for the content in accordance with the execution instruction information, and a returning section to return processing information relating to the processing executed by the processing execution section to the terminal device.

According to the present invention, the data structure of a document file includes: a content portion to store a content; and a menu information portion to store menu information of executable processing for the content.

The invention itself, together with further objects and attendant advantages, will best be understood by reference to the following detailed description taken in conjunction with the accompanying drawings.

BRIEF DESCRIPTION OF THE DRAWINGS

These and other objects, advantages and features of the invention will become apparent from the following description thereof taken in conjunction with the accompanying drawings in which.

DETAILED DESCRIPTION OF THE PREFERRED EMBODIMENT

Hereinafter, preferred embodiments will be described with reference to the accompanying drawings.

Figure 1:
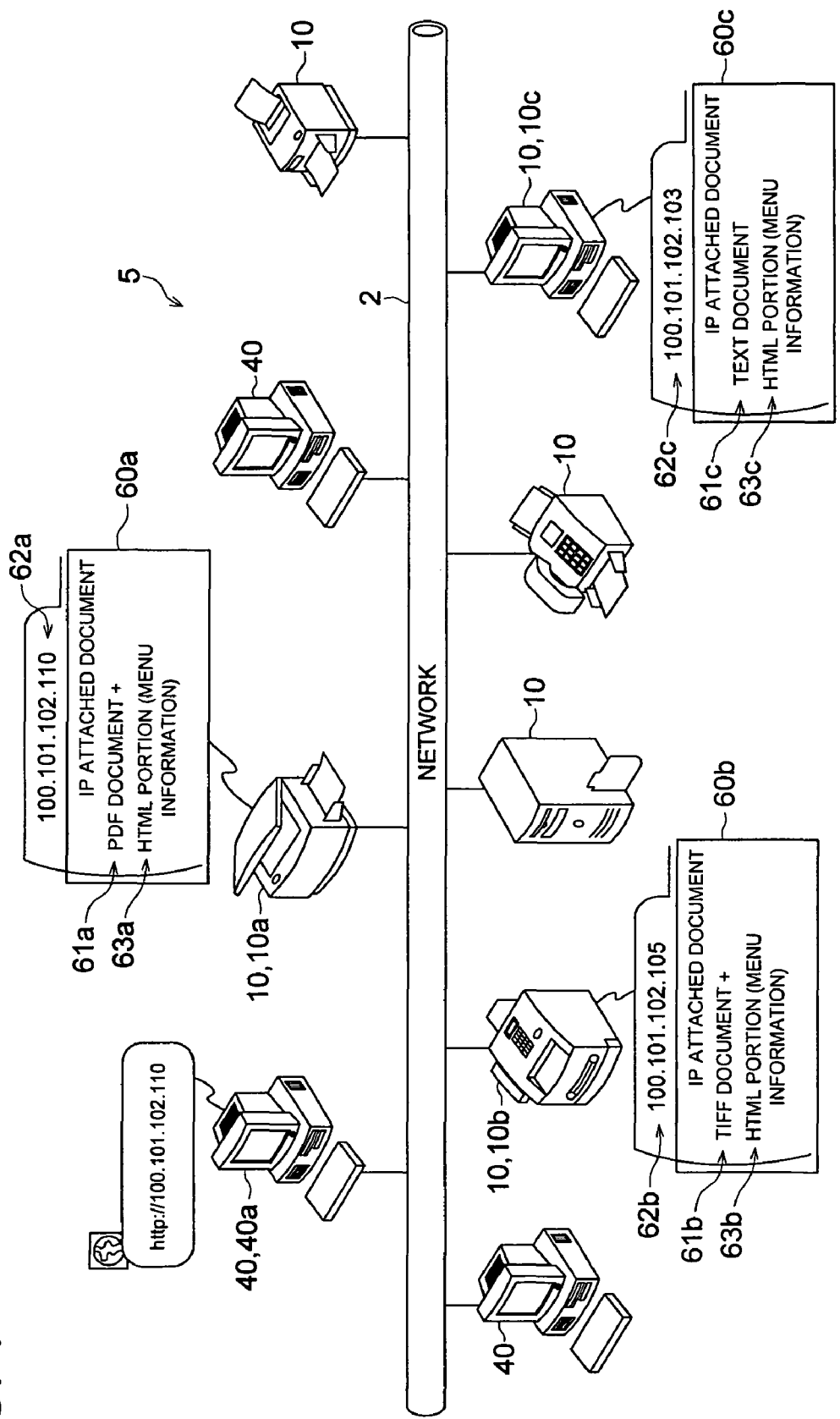
FIG. 1 is an explanatory diagram of the configuration of a document processing system which is a preferred embodiment of this invention.

FIG. 1 shows the configuration of document processing system 5 which is a preferred embodiment of this invention. Document processing system 5 is equipped with multiple document processing apparatus 10 which respectively contain document files and multiple terminal devices 40 which access document files stored in document processing apparatus 10, wherein document processing apparatus 10 and terminal devices 40 are interconnected by network 2. Network 2 is Internet or a LAN (Local Area Network) which uses Internet protocols.

Document processing apparatus 10 can be any information processing device as long as it can store document files. For example, scanner 10*a*, printer device 10*b*, and computer device 10*c* can be document processing apparatus 10. Scanner 10*a* optically reads document images and stores the resulting image data as document files. Printer device 10*b* stores document files to be printed. Computer device 10*c* stores files of documents which are created and edited by predetermined document creating programs and document files which are entered from external devices.

Terminal device 40 works to access and browse document files which are stored in document processing apparatus 10. Terminal device 40 contains, for example, a computer device and a general browser which is executed by the computer device.

By the way, the general browser is a means by which the operator accesses documents on a network or a local device. Substantially, the general browser is a program which accesses a document, receives document data available to the general browser, displays and processes the document data. The operator can specify a target document by entering its ID information into the browser. Generally, the browser is a www (World Wide Web) browser or the like and the ID information is an IP address.

Unlike the server and client environment which collectively stores documents in a specific server and the local environment which stores documents in independent devices, document processing system 5 store document files in multiple document processing apparatus 10 in a scattered manner. Terminal devices 40 in the environment directly and independently access document files in document processing apparatus 10 to process and browse them.

Figure 2:
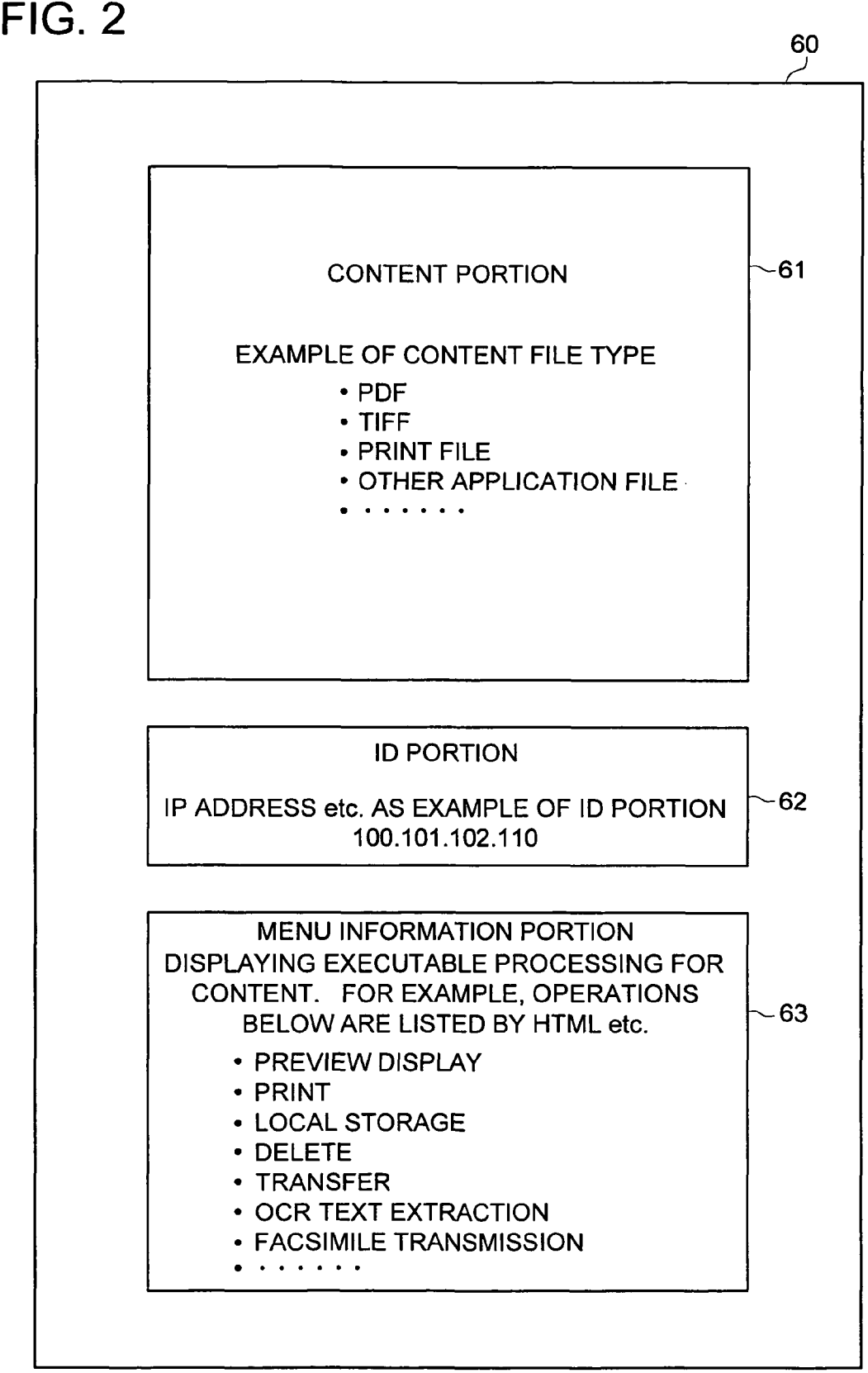
FIG. 2 is an explanatory example of a data structure of a document file which is stored in the document processing apparatus.

FIG. 2 shows a data structure of document file 60 which is stored in document processing apparatus 10. Document file 60 contains contents portion 61, ID portion 62, and menu information portion 63. Content portion 61 stores the contents (document entity) of document file 60. The document file contents are data of various kinds of formats such as PDF (Portable Document Format), TIFF (Tagged Image File Format), and text format, and various kinds of print data. Content portion 61 can store any types of data. Substantially, contents portion 61 can store coded data such as character codes, image data, and image-compressed data.

ID portion 62 stores ID information of the document file 60 to uniquely identify the file in document processing system 5. This example stores an IP address uniquely allocated to each document file as ID information to indicate a location which stores document file 60. The ID information can be IPv6 (Internet Protocol version 6) or other address information.

Menu information portion 63 stores menu information of processing (or operation) which can be executed on document contents stored in contents portion 61. The menu information stored in the section is formatted in HTML (Hyper Text Markup Language) which can be browsed and displayed on the www (World Wide Web) browser. The menu information format is not limited to HTML. It can be any e.g. XML (extensible Markup Language) or Flash (registered trade mark) as long as it is available to the browser of terminal device 40 which accesses the document file.

Menu information is data to be displayed on a menu screen, that is, selectable processing (or operational) items which can be executed on contents stored in contents portion 61. The items are for example, Preview, Print, Local Store, Delete, Transfer, Extract OCR (Optical Character Reader) Text, and FAX Transmit. By the way, the Extract OCR Text processing performs OCR (Optical Character Recognition) on PDF images which are document contents, extracts texts therefrom, reassembles the extracted texts into a PDF file, and stores the file as another layer. Generally, this processing is used to translate a PDF file to which character searching is not available into a PDF file to which character searching is available.

In the example of document processing system 5 of FIG. 1, scanner 10*a* stores document file 60*a*. Document file 60*a* contains an IP address (100.101.102.110) in ID portion 62*a*, a PDF file, for example, in contents portion 61*a*, and menu information (HTML data) which is executable on contents portion 61*a* in menu information portion 63*a*.

Document file 60*b* stored in printer device 10*b* contains an IP address (100.101.102.105) in ID portion 62*b*, a TIFF file, for example, in contents portion 61*b*, and menu information (HTML data) which is executable on contents portion 61*b* in menu information portion 63*b*.

Document file 60*c* stored in computer device 10*c* contains an IP address (100.101.102.103) in ID portion 62*c*, a text-format file, for example, in contents portion 61*c*, and menu information (HTML data) which is executable on contents portion 61*c* in menu information portion 63*c*.

The example of FIG. 1 shows that a www browser of terminal device 40*a* accesses a document of IP address 100.101.102.110, or document file 60*a* which is stored in scanner 10*a*.

Figure 3:
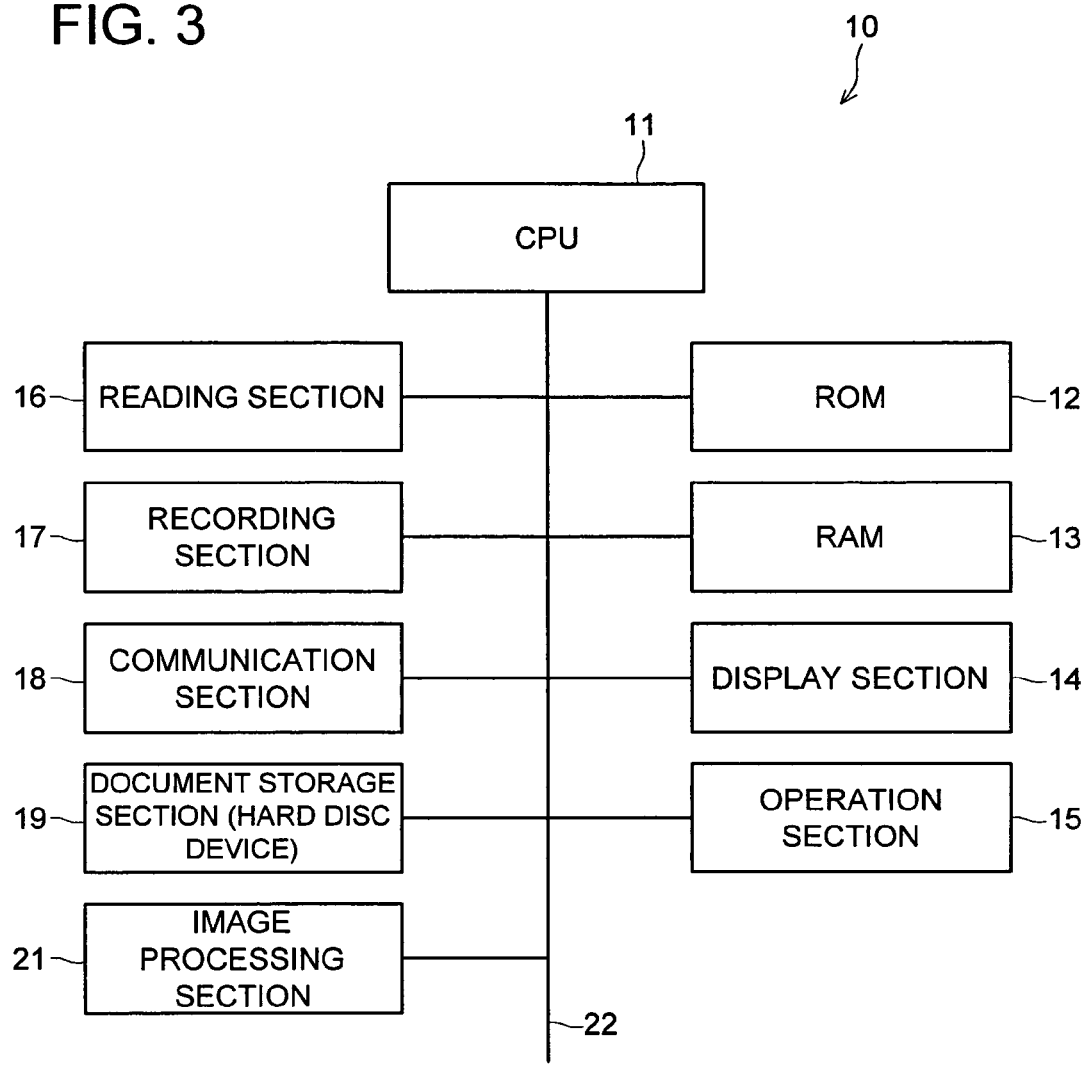
FIG. 3 is a block diagram showing an electric configuration of a multi-function device which works as a document processing apparatus.

FIG. 3 shows an example of configuration of document processing apparatus 10. Document processing apparatus 10 of FIG. 3 is equipped with multiple functions such as copier, scanner, printer, facsimile, and image storage functions and substantially works as a multi-function device. Multi-function devices 10 houses CPU (Central Processing Unit) 11, ROM (Read Only Memory) 12, RAM (Random Access Memory) 13, display section 14, operation section 15, reading section 16, recording section 17, communication section 18, document storage section 19, image processing section 21 and bus 22 which connects these components.

CPU 11 functions to collectively control operations of the multi-function device. ROM 12 is read-only memory which stores programs in advance. RAM 13 functions as work memory which temporarily stores various kinds of data used when CPU 11 executes programs stored in ROM 12 and as image memory to store image data.

Display section 14 is equipped with a liquid crystal display and other components and displays user-interface screens such as setting screens and operation screens. Operation section 15 comprises a touch panel and operation switches which are disposed on a liquid crystal display (LCD) screen and functions to receive various user operations.

Reading section 16 functions to optically read document images and output image data. Reading section 16 is equipped with a line image sensor and other parts.

Recording section 17 functions to form images corresponding to image data on recording paper. Recording section 17 of this example is equipped with a paper conveying device, a photoreceptor drum, a charging device, a laser unit, a developing device, a transfer and separation device, a cleaning device, and a fixing device. Recording section 17 is built up to work as an electrophotographic laser printer.

Communication section 18 functions to transfer signals and data to and from terminal devices 40 and other external units through network 2.

Document storage section 19 accumulates and stores document files 60 and is equipped with a large-capacity non-volatile storage unit such as a hard disk device.

Image processing section 21 functions to perform various kinds of processing such as enlargement, reduction, rotation, compression, and decompression on image data.

Figure 4:
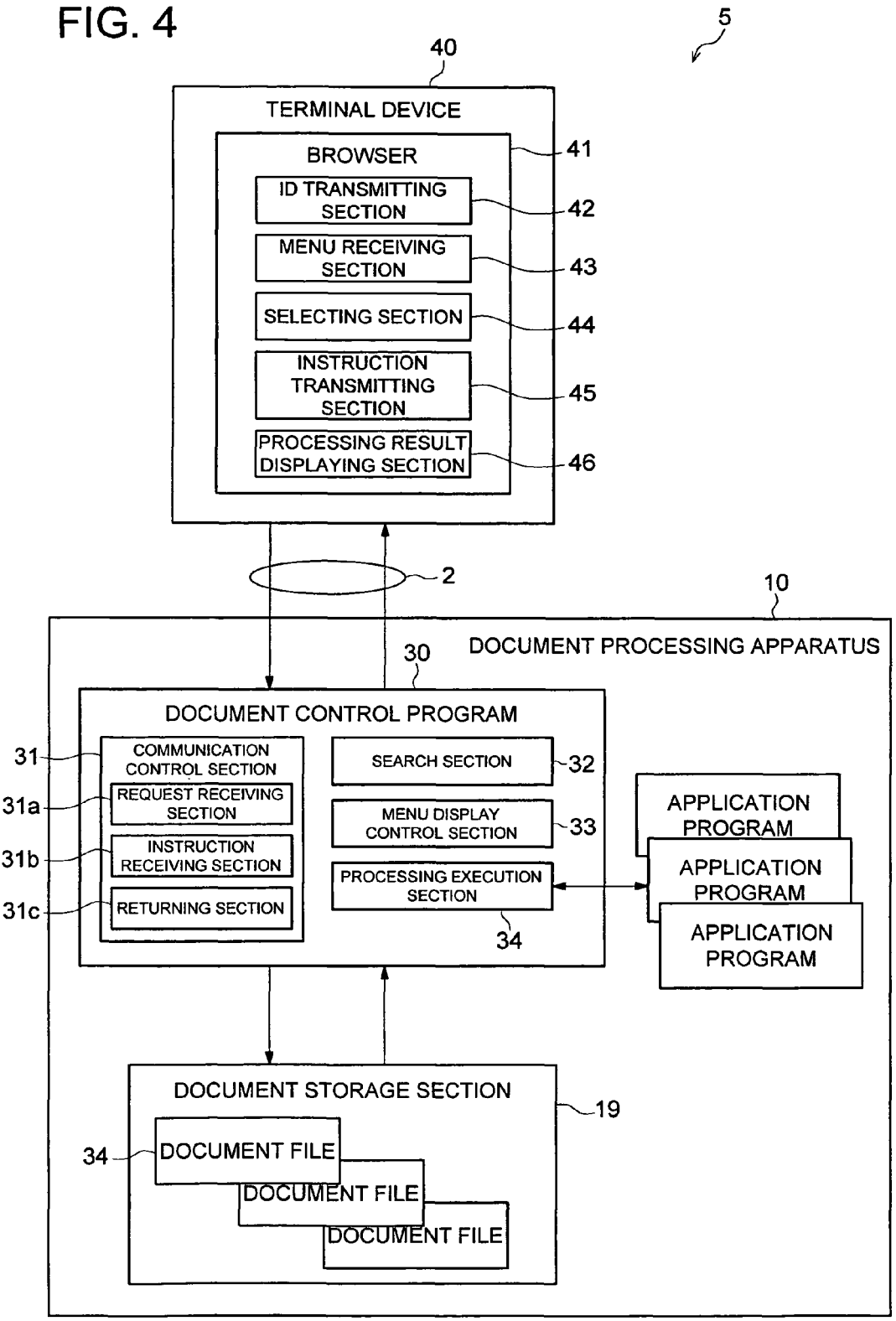
FIG. 4 shows a functional block diagram of a document processing system which is a preferred embodiment of this invention to explain the document file management of the system.

FIG. 4 shows a functional block diagram of document processing system 5 in association with management of document files 60. Document processing apparatus 10 executes document control program 30 which is stored in ROM 12 to perform functions of communication control section 31, search section 32, menu display control section 33, and processing execution section 34. Document control program 30 collectively controls accesses to document file 60 which is stored in document storage section 19. In other words, all accesses to document file 60 from external terminals such as terminal device 40 are implemented through document control program 30.

Communication control section 31 functions to control data transfer to and from terminal device 40 and substantially performs functions of request receiving section 31a, instruction receiving section 31b, and returning section 31c.

Browser 41 of terminal device 40 functions to receive web pages from document processing apparatus 10, display and operate them, and substantially performs functions of ID transmitting section 42, menu receive section 43, selection section 44, instruction transmitting section 45, processing result display section 46.

Browser 41 of terminal device 40 functions as ID transmitting section 42 which transmits ID information (IP address) to identify a target document file to document processing apparatus 10. In other words, the browser 41 of terminal device 40 functions as a request receiving section which performs an access request to the document file.

Request receiving section 31a of document processing apparatus 10 functions to receive ID information (IP address) from terminal device 40. Search section 32 functions to search, in document storage section 19, document file 60 whose ID information (IP address) in ID portion 62 matches ID information (IP address) received by request receiving section 31a.

When search section 32 detects, in document storage section 19, document file 60 whose ID information (IP address) in ID portion 62 matches ID information (IP address) received by request receiving section 31a, menu display control section 33 takes out menu information from menu information portion 63 of document file 60 and transmits it to terminal device 40.

Menu receiving section 43 of terminal device 40 functions to receive menu information sent from document processing apparatus 10. Selection section 44 functions to select a processing to be executed on document file 60 according to the menu information received by menu receive section 43. Substantially, a menu screen is displayed according to menu information which is display data in HTML. The operator selects processing to be executed on document file 60 among items displayed on the menu screen. Instruction transmitting section 45 functions to transmit execution instruction information pertaining to the processing selected by selection section 44 to document processing apparatus 10.

Instruction receiving section 31b of document processing apparatus 10 functions to receive execution instruction information from terminal device 40. Processing execution section 34 functions to process contents of the relevant document file 60 according to execution instruction information received by instruction receiving section 31b. For example, processing execution section 34 executes processing specified by the execution instruction information on the contents of document file 60 by using an application program which is stored in document processing apparatus 10 or the other device in document processing system 5.

Returning section 31c functions to return the contents or result of processing executed by processing execution section 34 to terminal device 40 which requested the processing of the contents.

Processing result display section 46 of terminal device 40 functions to receive the processing information from document processing apparatus 10 and display it on the browser screen.

Figure 5:
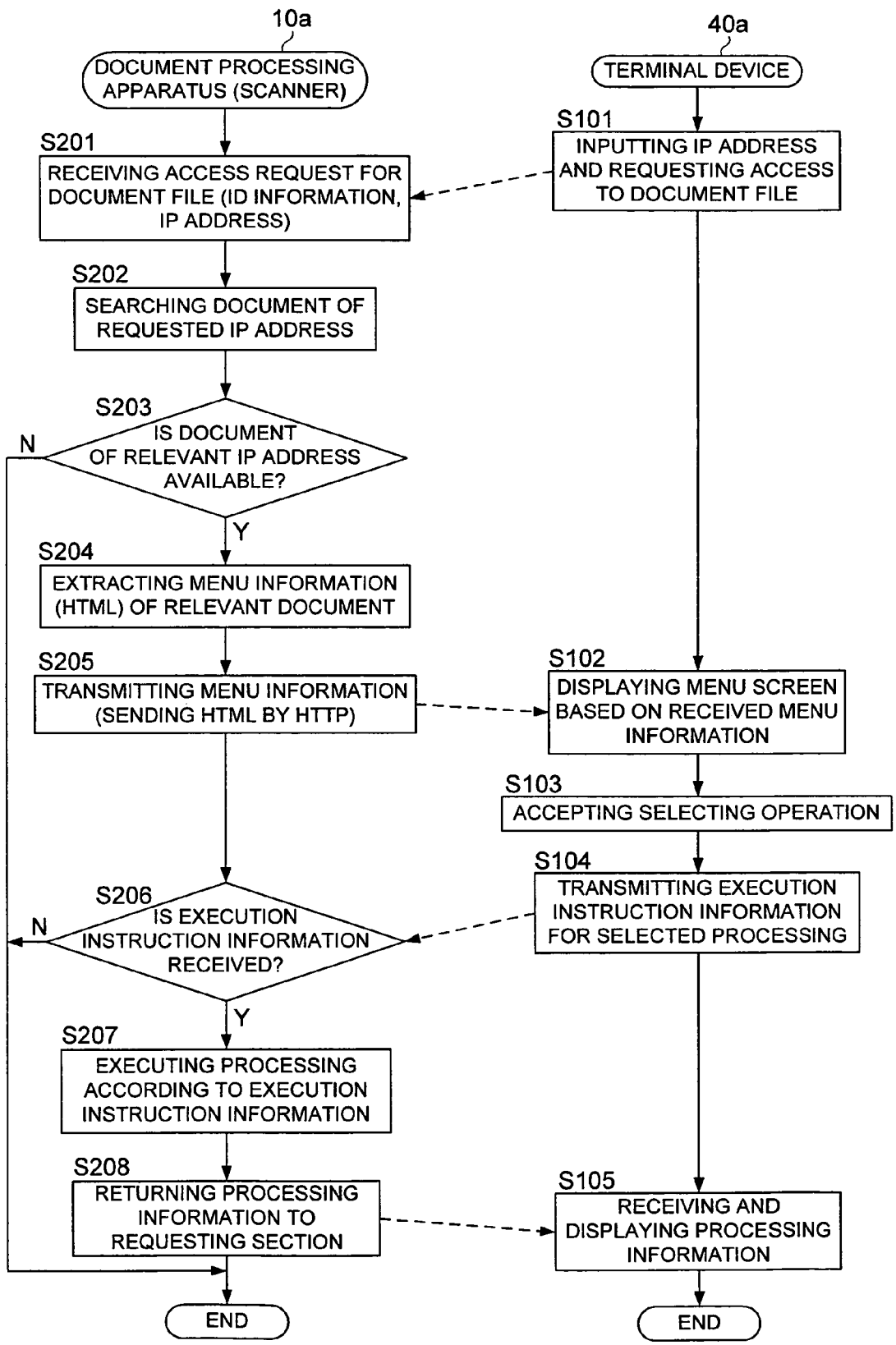
FIG. 5 shows an operational flow diagram pertaining to processing of document files in the document processing system which is a preferred embodiment of this invention.

FIG. 5 shows an operational flow diagram pertaining to processing of document files in document processing system 5. In this example, terminal device 40a of FIG. 1 processes document file 60a (document at IP address "100.101.102.110") which is stored in scanner 10a. The user enters the IP address (100.101.102.110) of target document file 60a in browser 41 of terminal device 40a to make a request to access document file 60a (Step S101).

When receiving an access request (Step S201), document processing apparatus (scanner) 10a searches document storage section 19 in the apparatus (scanner 10a) for a document file (60a) whose IP address matches the requested IP address (Step S202). If a document file (60a) of the requested IP address is not found (Step S203; N), document processing apparatus (scanner) 10a ends the processing (End). When a document file (60a) of the requested IP address is found in document storage section 19 (Step S203; Y), document processing apparatus (scanner) 10a continues processing so that document file 60a may behave like a single network device.

In details, document processing apparatus (scanner) 10a extracts menu information (written in HTML in this example) from menu information portion 63 in document file 60a (Step S204) and sends its content as an HTTP (Hyper Text Transfer Protocol) response to browser 41 of terminal device 40a (Step S205) which made the request.

Browser 41 of terminal device 40a receives menu information in HTML from scanner 10a and displays a menu screen according to the menu information (Step S102). The user (operator) selects a processing (operation) to execute on document file 60a (Step S103).

FIG. 6(a) shows an example of menu screen 70 displayed on browser 41 of terminal device 40a. Menu screen 70 shows IP address 71 of document file 60a to be processed and selective processing (operation) buttons 72a to 72d to be executed on document file 60a. Each of buttons 72a to 72d has an operation name (Operation A, Operation B, etc.) and the content of the operation (Preview, Local Store, etc.) on its top.

When the user selects one of the buttons 72a to 72d on menu screen 70, browser 41 of terminal device 40a sends execution instruction information corresponding to the selected processing to scanner 10a (Step S104 in FIG. 5). The execution instruction information contains the content (Preview, Local Store, etc.) of the selected processing (operation).

When receiving the execution instruction information from terminal device 40a (Step S206; Y), scanner 10a executes processing corresponding to the received execution instruction information on the content of document file 60a which is detected at Step S202 (Step S207). For example, when Operation D button 72d which functions to extract an OCR text is selected on menu screen 70, processing execution section 34 executes the OCR text extraction processing on document file 60a.

Substantially, processing execution section 34 calls an application program for the OCR text extraction processing and executes OCR text extraction processing on the contents (PDF file) of document file 60a. The application program to be executed is not limited to that stored in scanner 10a. It can be an external available program or a program such as a Java (registered trade mark) applet which can be downloaded from network. It is possible to remotely use an appropriate application program which is stored inside or outside document processing system 5 (if any) to process the document file.

Figure 6:
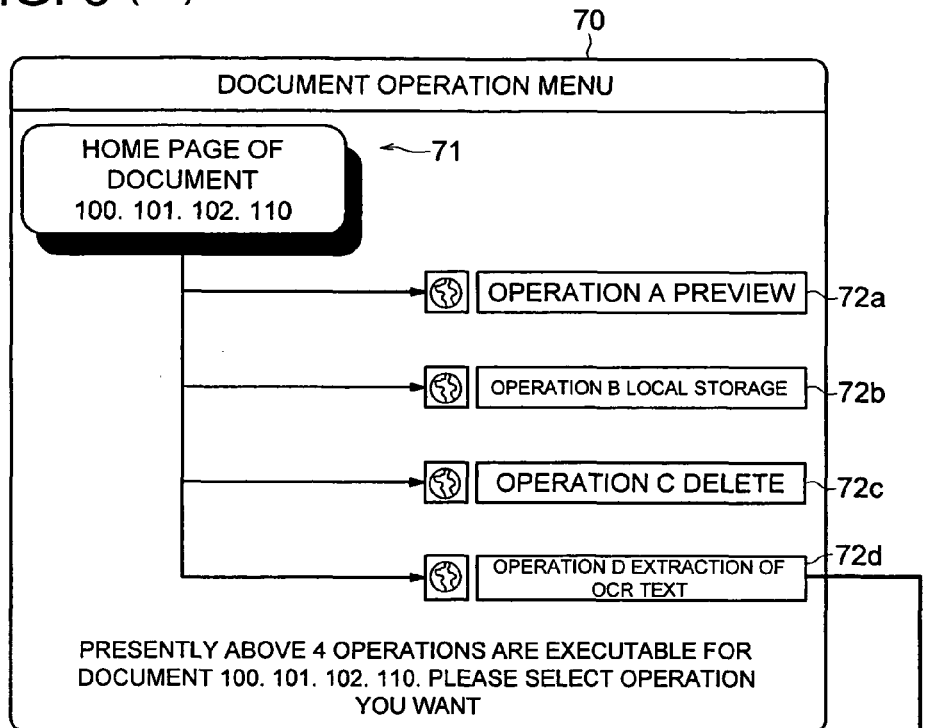
FIG. 6 shows an example of a menu screen displayed by a browser of a terminal device to explain simulation of OCR text processing.
Figure 6:
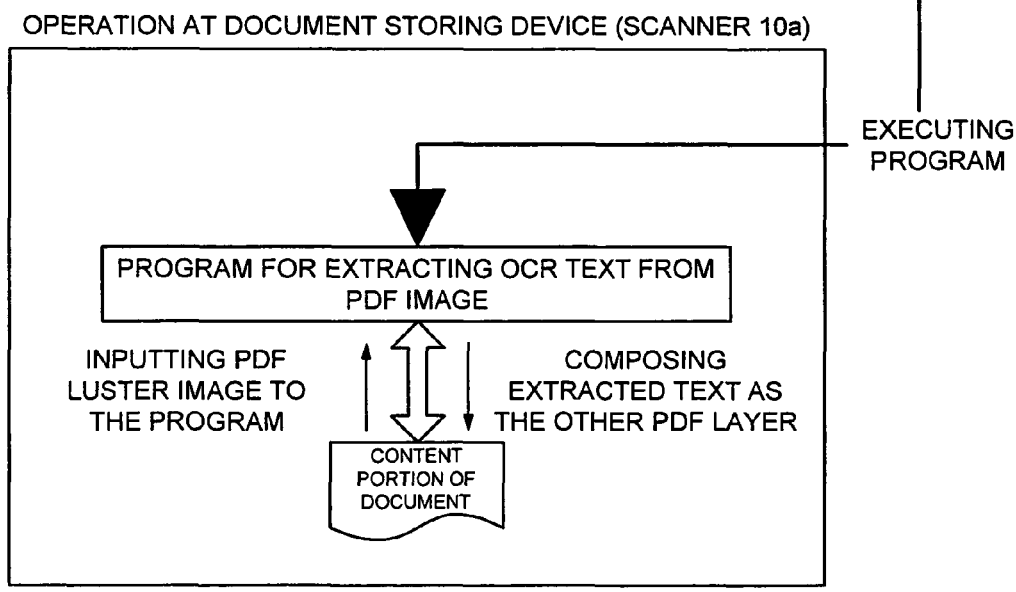

FIG. 6(*b*) shows a simulated OCR text processing on contents 61*a* of document file 60*a*. In details, processing execution section 34 inputs a PDF file which is contents 61*a* of document file 60*a*, extracts character information from its raster image by OCR processing, and reassembles the extracted character information into a PDF file which is on another layer. In this processing, the contents in contents portion 61*a* are updated and re-written.

By the way, after OCR text processing is executed on contents portion 61*a* of document file 60*a*, the OCR text processing function need not be required. Therefore, it is possible to update the menu information of menu information portion 63*a* and make Operation D button 72*d* for OCR text extraction invisible on menu screen 70. In other words, when a processing which is executable before it is executed becomes disabled or inexecutable after it is executed, the menu information of document file 60 can be updated to make the corresponding button 72 (Operation D button in this example) invisible on the menu screen.

Further, after the OCR text extraction processing is executed, document file 60*a* can be displayed in text. So it is possible to update menu information of document file 60*a* so that new operation button 72 may be added to the menu screen to display document file 60 in text. In other words, when a new processing becomes executable after a processing is executed, the menu information of document file 60 can be updated to add an operation button 72 for the processing to the menu screen.

After executing the processing specified by the execution instruction information, scanner 10*a* returns the contents or result of the processing to requesting terminal device 40 (Step S208 in FIG. 5) and ends processing (End). Terminal device 40*a* receives the processing contents or result from scanner 10*a*, displays it on browser 41 (Step S105) and ends processing (End).

The contents and result of processing can be, for example, "Notification of the end of processing," "Notification of the number of extracted characters," "Displaying the extracted character strings to a browser," or a combination thereof. Terminal device 40*a* receives the contents or result of processing from scanner 10*a* and know that the previous operation is completed or the content of processing.

In this way, this invention provides ID portion 62 in document file 60 and stores an IP address which is uniquely assigned to each document file 60 so as to allow each document file 60 to behave as a single network device with an intervention of document control program 30. So the user can access target document file 60 by entering an IP address of a target document file for a www browser. As the result, the user can easily reach the target document file without remembering the name of device at a storage location. This can assure the good accessibility to document files.

Further, when a general browser accesses a document file, the browser screen displays a menu of processing (operations) which can be executed on the contents portion of the document file according to menu information stored in the menu information portion of the document file. Therefore, the user can easily and exactly know processing (operations) which are executable on the document file.

Particularly, if detailed information about executable processing is retained in menu information portion 63 of document file 60, the user can get more information about processing (operations) which are executable on the document file than that by extensions in the UNC format.

Further, when the user singly selects an operation button of a desired processing (operation) among operation buttons 72 displayed on menu screen 70, the selected processing (operation) is executed on the contents of a target document file in document processing apparatus 10 which stores the target document file. Therefore, the user need not remember processing (operations) which are executable on various kinds of contents in advance and application programs for processing (operations). This can assure high operability on document file contents.

While this invention has been described above with respect to its preferred embodiments referring to accompanying drawings, it should be understood that the concrete structures are not limited to the preferred embodiments of the invention and that various changes and modifications can be made within the spirit and scope of the invention.

For example, although the preferred embodiment provides ID portion 62 in the data structure of document file 60, ID portion 62 need not be provided depending upon methods of storing or accessing document file. For example, when a UNC format is used to identify a target document file by its storage location, the data structure of the document file can contain only contents portion 61 and menu information portion 63. It need not provide ID portion 62.

By the way, the menu information to be stored in menu information portion 63 of document file 60 is created according to the current system state and content types when document file 60 is created. However, the menu information can be re-written when document file 60 is transferred or when its content is processed.

For example, when document file 60 is created and stored, document processing apparatus 10 judges available application software and kind of processing which is executable on the contents according to the type of the application software available to document processing system 5 at that time instance and the type of contents of document file 60, and creates menu information according to the result of the judgment. Further when document file 60 is transferred to document processing apparatus 10 and the content of apparatus 10 changes or when the state of an application program available to document processing system 5 changes, the content of menu information can be rewritten.

Further, it is possible to change IDs (IP addresses) when document file 60 is transferred.

Below will be described examples of document processing apparatus, document processing system and data structure of document file which reflect features of the present embodiment to attain the above objects of this invention.

(1) A document processing apparatus including: a communication section to communicate with an external device; a document storage section to store a document file including a content portion and a menu information portion, wherein a content is stored in the content portion and menu information of executable processing for the content is stored in the menu information portion; and a menu display control section to control the communication section so as to transmit the menu information of an accessed document file to the external device, when an access request for the document file is received from external device via the communication section.

In accordance with the apparatus of (1), the document storage section stores a document file whose data structure contains a contents portion which stores contents and a menu information portion which stores information of a menu of processing executable on the contents. When receiving a request to access a document file which is stored in the document storage section from an external terminal, the menu display control section sends the menu information of the document file for which an access request is made to the external terminal. The menu information can be any information as long as it indicates types of processing which are executable on contents stored in the contents portion. For example, the menu information can be data to display a menu screen or source data to create display data.

(2) A document processing apparatus including: a communication section to communicate with an external device; a document storage section to store a document file including a identification portion, a content portion and a menu information portion, wherein identification information is stored in the identification portion, a content is stored in the content portion and menu information of executable processing for the content is stored in the menu information portion; a search section to search a document file in the document storage section, when identification information from the external device is received via the communication section, wherein the identification portion of a searched document file stores identification information matches the identification information received at the communication section; and a menu display control section to control the communication section so as to transmit the menu information of the searched document file to the external device.

A document processing system reflecting another feature of the present invention includes: a terminal device; and a document processing apparatus connected to the terminal device, wherein the terminal device comprises; a request transmitting section to transmit an access request for a document file to the document processing apparatus, wherein the document processing apparatus comprises; a document storage section to store a document file including a content portion and a menu information portion, wherein a content is stored in the content portion and menu information of executable processing for the content is stored in the menu information portion, a request receiving section to receive the access request from the terminal device, and a menu display control section to control the communication section so as to transmit the menu information of an accessed document file to the terminal device, wherein the terminal device further comprises; a menu receiving section to receive the menu information from the document processing apparatus, a selecting section to accept to select a processing based on the menu information, and an instruction transmitting section to transmit an execution instruction information relating to the processing selected at the selecting section, wherein the document processing apparatus further comprises; an instruction receiving section to receive the execution instruction information, a processing execution section to execute the processing for the content in accordance with the execution instruction information, and a returning section to return processing information relating to the processing executed by the processing execution section to the terminal device.

A document processing system reflecting another feature of the present invention includes: a terminal device; and a document processing apparatus connected to the terminal device, wherein the terminal device comprises; identification information transmitting section to transmit identification information for a document file to the document processing apparatus, wherein the document processing apparatus comprises; a document storage section to store a document file including a identification portion, a content portion and a menu information portion, wherein identification information is stored in the identification portion, a content is stored in the content portion and menu information of executable processing for the content is stored in the menu information portion; identification information receiving section to receive the identification information from the terminal device, a search section to search a document file in the document storage section, when identification information from the external device is received via the communication section, wherein the identification portion of a searched document file stores identification information matches the identification information received at the communication section; and a menu display control section to control the communication section so as to transmit the menu information of the searched document file to the external device, wherein the terminal device further comprises; a menu receiving section to receive the menu information from the document processing apparatus, a selecting section to accept to select a processing based on the menu information, and an instruction transmitting section to transmit an execution instruction information relating to the processing selected at the selecting section, wherein the document processing apparatus further comprises; an instruction receiving section to receive the execution instruction information, a processing execution section to execute the processing for the content in accordance with the execution instruction information, and a returning section to return processing information relating to the processing executed by the processing execution section to the terminal device.

In accordance with the apparatus of (2), the document storage section stores a document file whose data structure contains an ID portion which stores ID information to identify a document file, a contents portion which stores contents and a menu information portion which stores information of a menu of processing executable on the contents. When receiving ID information from an external terminal, the search section searches the document storage section for a document file whose ID information matches the received ID information. When the search section finds a requested document file, the menu display control section takes menu information from the menu information portion from the document file and sends it to the external terminal.

ID information is identification information to identify a document file and preferably contains no information about a storage location of the document file. The menu information can be any information as long as it indicates types of processing which are executable on contents stored in the contents portion. For example, the menu information can be data to display a menu screen or source data to create display data.

(3) The apparatus of (1) or (2), further including a processing execution section to execute the processing for the content in accordance with an execution instruction information, when the execution instruction information relating to a processing selected at the external device based on the menu information is received.

In accordance with the apparatus (3), a processing is selected from menu information sent from the menu display control section to the external terminal. The execution instruction information about the selected processing is sent from the external terminal to the document processing apparatus. When receiving the execution instruction information from the external terminal, the processing execution section of the document processing apparatus executes the processing which was specified by the execution instruction information on the contents of a relevant document file. In other words, the types of processing executable on the document file are shown to the user in the form of menu information which is stored in the menu information portion. A processing selected by the user on the menu is executed by the document processing apparatus.

(4) The apparatus of (3), wherein the menu information is changed, when the executable processing for the content is changed in accordance with the processing executed by the processing execution section.

(5) The apparatus of (3), further including: a returning section to control the communication section so as to return processing information relating to the processing executed by the processing execution section to the external device.

In accordance with the above modes, the types of processing executable on the document file are shown to the user in the form of menu information which is stored in the menu information portion and a processing selected by the user on the menu is executed by the document processing apparatus. The result of the processing (information about the processing) is returned to the external terminal.

(6) The apparatus of any one of (2)-(5), wherein the menu display control section controls the communication section so as to transmit display data of a menu display corresponding to the menu information to the external device.

In accordance with the above mode, the data displayed on the menu screen according to menu information which is stored in the menu information portion is sent to the external terminal. The display data on the menu screen can be menu information itself or can be created according to menu information by the menu display control section. The display data on the menu screen is expressed for example in HTML.

(7) The apparatus of (2), wherein the identification information is unique address information of a network allocated to the document file.

(8) The apparatus of (7), wherein the unique address information is changed, when a storage location of the document file is changed.

(9) The apparatus of (2), wherein the identification information is unique IP address allocated to the document file.

In accordance with the above mode, document files on the network can be identified by IP addresses which are uniquely allocated to the document files in advance. By using IP addresses, the user can access target document files without knowing their storage locations on the network.

(10) The apparatus of (9), wherein the unique IP address is changed, when a storage location of the document file is changed.

(11) A document processing system reflecting another feature of the present invention includes: a terminal device; and a document processing apparatus connected to the terminal device, wherein the terminal device comprises; a request transmitting section to transmit an access request for a document file to the document processing apparatus, wherein the document processing apparatus comprises; a document storage section to store a document file including a content portion and a menu information portion, wherein a content is stored in the content portion and menu information of executable processing for the content is stored in the menu information portion, a request receiving section to receive the access request from the terminal device, and a menu display control section to control the communication section so as to transmit the menu information of an accessed document file to the terminal device, wherein the terminal device further comprises; a menu receiving section to receive the menu information from the document processing apparatus, a selecting section to accept to select a processing based on the menu information, and an instruction transmitting section to transmit an execution instruction information relating to the processing selected at the selecting section, wherein the document processing apparatus further comprises; an instruction receiving section to receive the execution instruction information, a processing execution section to execute the processing for the content in accordance with the execution instruction information, and a returning section to return processing information relating to the processing executed by the processing execution section to the terminal device.

In accordance with the above mode, the document storage section of the document processing apparatus stores a document file whose data structure contains a contents portion which stores contents and a menu information portion which stores information of a menu of processing executable on the contents. When receiving a request to access a target document file from the terminal device, the document processing apparatus takes menu information which is stored in the menu information portion of the relevant document file and sends the menu information to the terminal device.

When receiving menu information from the document processing apparatus, the terminal device shows the user the kinds of processing which are executable on the document file, causes the user to select a processing, and sends execution instruction information about the selected processing to the document processing apparatus. When receiving execution instruction information from the terminal device, the document processing apparatus processes the contents of the relevant document file according to the received execution instruction information, and returns the result of the processing to the terminal device.

(12) A document processing system including: a terminal device; and a document processing apparatus connected to the terminal device, wherein the terminal device comprises; identification information transmitting section to transmit identification information for a document file to the document processing apparatus, wherein the document processing apparatus comprises; a document storage section to store a document file including a identification portion, a content portion and a menu information portion, wherein identification information is stored in the identification portion, a content is stored in the content portion and menu information of executable processing for the content is stored in the menu information portion; identification information receiving section to receive the identification information from the terminal device, a search section to search a document file in the document storage section, when identification information from the external device is received via the communication section, wherein the identification portion of a searched document file stores identification information matches the identification information received at the communication section; and a menu display control section to control the communication section so as to transmit the menu information of the searched document file to the external device, wherein the terminal device further comprises; a menu receiving section to receive the menu information from the document processing apparatus, a selecting section to accept to select a processing based on the menu information, and an instruction transmitting section to transmit an execution instruction information relating to the processing selected at the selecting section, wherein the document processing apparatus further comprises; an instruction receiving section to receive the execution instruction information, a processing execution section to execute the processing for the content in accordance with the execution instruction information, and a returning section to return processing information relating to the processing executed by the processing execution section to the terminal device.

In accordance with the above mode, the document storage section stores a document file whose data structure contains an ID portion which stores ID information to identify a document file, a contents portion which stores contents and a menu information portion which stores information of a menu of processing executable on the contents. The terminal device sends the ID information of a target document file to the document processing apparatus. When receiving the ID information from the terminal device, the document processing apparatus searches the document storage section for a document file whose ID information matches the received ID information. When finding a relevant document file, the document processing apparatus takes menu information from the menu information portion of the document file and returns the menu information to the terminal device.

When receiving menu information from the document processing apparatus, the terminal device shows the user the kinds of processing which are executable on the document file, causes the user to select a processing, and sends execution instruction information about the selected processing to the document processing apparatus. When receiving execution instruction information from the terminal device, the document processing apparatus processes the contents of the relevant document file according to the received execution instruction information, and returns the result of the processing to the terminal device.

(13) The document processing system of (11) or (12), wherein the menu information is changed, when the executable processing for the content is changed in accordance with the processing executed by the processing execution section.

(14) The document processing system of (11) or (12), wherein the menu display control section controls the communication section so as to transmit display data of a menu display corresponding to the menu information to the terminal device.

(15) The document processing system of (12), wherein the identification information is unique address information of a network allocated to the document file.

(16) The document processing system of (15), wherein the unique address information is changed, when a storage location of the document file is changed.

(17) The document processing system of (12), wherein the identification information is unique IP address allocated to the document file.

(18) The document processing system of (17), wherein the unique IP address is changed, when a storage location of the document file is changed.

(19) A data structure of a document file, including:
 a content portion to store a content; and
 a menu information portion to store menu information of executable processing for the content.

In accordance with the above mode, the user can know the kinds of processing which are executable on the contents stored in the contents portion by the menu information stored in the menu information portion.

(20) The data structure of (19), further including: identification portion to store identification information.

In accordance with the above mode, the user can identify a target document file by the ID information and the kinds of processing which are executable on the contents of the contents portion by menu information stored in the menu information portion.

(21) The data structure of (20), wherein the identification information is unique address information of a network allocated to the document file.

(22) The data structure of (20), wherein the identification information is unique IP address allocated to the document file.

In accordance with the above mode, the user can access a target document file by using an IP address without knowing the storage location of the file on the network.

According to one aspect of this invention, a document file is equipped with a data structure which contains a contents portion which stores contents and a menu information portion which stores information of a menu of processing executable on the contents. When a request to access the document file is made by an external device, the menu information of the relevant document file is returned to the external terminal. Therefore, the user on the external device can easily know the processing which are executable on the document file. This can increase the operability of document files.

Further, when the user singly selects a processing according to menu information, the selected processing is executed on the contents of a relevant document file. Therefore, the user need not remember kinds of programs required for execution of processing and operating procedures. This assures preferred operability and convenience.

Further, when the data structure of a document file contains an ID portion which stores ID (Identification) information of the document file, the document file to be accessed can be easily identified by the ID information. Therefore, even in a peer-to-peer environment, the user can access a target document file without knowing the storage location (such as a storage device name) of the document file.

What is claimed is:

1. A document processing apparatus, comprising:
 a CPU to control the document processing apparatus;
 a communication section to communicate with an external device;
 a document storage section to store a document file which is configured to comprise a content portion and a menu information portion, wherein a content of document is stored in the content portion and menu information of executable document processing for the content of document, stored in the content portion, is stored in the menu information portion; and
 a menu display control section to control the communication section, when the document processing apparatus receives an access request for a document file from an external device via the communication section, so as to transmit the menu information of executable document processing stored in the menu information portion of the accessed document file to the external device.

2. The document processing apparatus of claim 1, further comprising:
 a processing execution section to execute, when the document processing apparatus receives execution instruction information relating to a document processing selected at the external device based on the transmitted menu information, the document processing for the content in the accessed document file in accordance with the execution instruction information.

3. The document processing apparatus of claim 2, wherein the menu information is changed, when the executable processing for the content is changed in accordance with the processing executed by the processing execution section.

4. The document processing apparatus of claim 2, further comprising:

a returning section to control the communication section so as to return processing information relating to the processing executed by the processing execution section to the external device.

5. The document processing apparatus of claim 1, wherein the menu display control section controls the communication section so as to transmit display data of a menu display corresponding to the menu information to the external device.

6. The document processing apparatus of claim 1, wherein the menu display control section controls the communication section not to transmit the content portion of the accessed document file when the communication section transmits the menu information of executable document processing to the external device.

7. A document processing apparatus, comprising:
a CPU to control the document processing apparatus;
a communication section to communicate with an external device;
document storage section to store a document file which is configured to comprise a identification portion, a content portion and a menu information portion, wherein identification information is stored in the identification portion, a content of document is stored in the content portion and menu information of executable document processing for the content of document, stored in the content portion, is stored in the menu information portion;
a search section to search a document file in the document storage section, when identification information from the external device is received via the communication section, wherein the identification portion of a searched document file stores identification information matching the identification information received at the communication section; and
a menu display control section to control the communication section so as to transmit the menu information of the searched document file to the external device.

8. The document processing apparatus of claim 7, further comprising:
a processing execution section to execute the processing for the content in accordance with an execution instruction information, when the execution instruction information relating to a processing selected at the external device based on the menu information is received.

9. The document processing apparatus of claim 8, wherein the menu information is changed, when the executable processing for the content is changed in accordance with the processing executed by the processing execution section.

10. The document processing apparatus of claim 6, further comprising:
a returning section to control the communication section so as to return processing information relating to the processing executed by the processing execution section to the external device.

11. The document processing apparatus of claim 7, wherein the menu display control section controls the communication section so as to transmit display data of a menu display corresponding to the menu information to the external device.

12. The document processing apparatus of claim 7, wherein the identification information is unique address information of a network allocated to the document file.

13. The document processing apparatus of claim 12, wherein the unique address information is changed, when a storage location of the document file is changed.

14. The document processing apparatus of claim 7, wherein the identification information is unique IP address allocated to the document file.

15. The document processing apparatus of claim 14, wherein the unique IP address is changed, when a storage location of the document file is changed.

16. The document processing apparatus of claim 7, wherein the menu display control section controls the communication section not to transmit the content portion of the searched document file when the communication section transmits the menu information of the searched document file to the external device.

17. A document processing system, comprising:
a terminal device; and
a document processing apparatus connected to the terminal device,
wherein the terminal device comprises
a request transmitting section to transmit an access request for a document file to the document processing apparatus,
wherein the document processing apparatus comprises
a document storage section to store a document file which is configured to comprise a content portion and a menu information portion, wherein a content of document is stored in the content portion and menu information of executable document processing for the content of document, stored in the content portion, is stored in the menu information portion,
a request receiving section to receive the access request from the terminal device, and
a menu display control section to control the communication section so as to transmit the menu information of executable document processing stored in the menu information portion of the accessed document file to the terminal device,
wherein the terminal device further comprises
a menu receiving section to receive the menu information from the document processing apparatus,
a selecting section to accept to select a document processing based on the menu information, and
an instruction transmitting section to transmit an execution instruction information relating to the document processing selected at the selecting section,
wherein the document processing apparatus further comprises
an instruction receiving section to receive the execution instruction information,
a processing execution section to execute the document processing for the content in accordance with the execution instruction information, and
a returning section to return processing information relating to the document processing executed by the processing execution section to the terminal device.

18. The document processing system of claim 17, wherein the menu information is changed, when the executable processing for the content is changed in accordance with the processing executed by the processing execution section.

19. The document processing system of claim 17, wherein the menu display control section controls the communication section so as to transmit display data of a menu display corresponding to the menu information to the terminal device.

20. The document processing apparatus of claim 17, wherein the menu display control section controls the communication section not to transmit the content portion of the accessed document file when the communication section transmits the menu information of executable document processing to the external device.

21. A document processing system, comprising:
   a terminal device; and
   a document processing apparatus connected to the terminal device,
   wherein the terminal device comprises
      identification information transmitting section to transmit identification information for a document file to the document processing apparatus,
   wherein the document processing apparatus comprises
      a document storage section to store a document file which is configured to comprise an identification portion, a content portion and a menu information portion, wherein identification information is stored in the identification portion, a content of document is stored in the content portion and menu information of executable document processing for the content of document, stored in the content portion, is stored in the menu information portion;
      identification information receiving section to receive the identification information from the terminal device,
      a search section to search a document file in the document storage section, when identification information from the external device is received via the communication section, wherein the identification portion of a searched document file stores identification information matching the identification information received at the communication section; and
      a menu display control section to control the communication section so as to transmit the menu information of the searched document file to the external device,
   wherein the terminal device further comprises
      a menu receiving section to receive the menu information from the document processing apparatus,
      a selecting section to accept to select a document processing based on the menu information, and
      an instruction transmitting section to transmit an execution instruction information relating to the document processing selected at the selecting section,
   wherein the document processing apparatus further comprises
      an instruction receiving section to receive the execution instruction information,
      a processing execution section to execute the processing for the content in accordance with the execution instruction information, and
      a returning section to return processing information relating to the processing executed by the document processing execution section to the terminal device.

22. The document processing system of claim 21, wherein the menu information is changed, when the executable processing for the content is changed in accordance with the processing executed by the processing execution section.

23. The document processing system of claim 21, wherein the menu display control section controls the communication section so as to transmit display data of a menu display corresponding to the menu information to the terminal device.

24. The document processing system of claim 21, wherein the identification information is unique address information of a network allocated to the document file.

25. The document processing system of claim 24, wherein the unique address information is changed, when a storage location of the document file is changed.

26. The document processing system of claim 21, wherein the identification information is unique IP address allocated to the document file.

27. The document processing system of claim 26, wherein the unique IP address is changed, when a storage location of the document file is changed.

28. The document processing apparatus of claim 21, wherein the menu display control section controls the communication section not to transmit the content portion of the searched document file when the communication section transmits the menu information of the searched document file to the external device.

* * * * *